(12) United States Patent
Federspiel et al.

(10) Patent No.: US 11,567,966 B2
(45) Date of Patent: Jan. 31, 2023

(54) EFFECTIVENESS MAPS

(71) Applicant: Vigilent Corporation, Oakland, CA (US)

(72) Inventors: Clifford C. Federspiel, El Cerrito, CA (US); Peter C. Varadi, El Cerrito, CA (US)

(73) Assignee: Vigilent Corporation, Oakland, CA (US)

( * ) Notice: Subject to any disclaimer, the term of this patent is extended or adjusted under 35 U.S.C. 154(b) by 24 days.

(21) Appl. No.: 17/014,780

(22) Filed: Sep. 8, 2020

(65) Prior Publication Data

US 2021/0073243 A1 Mar. 11, 2021

Related U.S. Application Data (60) Provisional application No. 62/897,099, filed on Sep. 6, 2019.

(51) Int. Cl.
| | | |
|---|---|---|
| *G06F 16/26* | (2019.01) | |
| *F24F 11/65* | (2018.01) | |
| *G05B 19/042* | (2006.01) | |
| *G06F 16/44* | (2019.01) | |
| *G06F 16/28* | (2019.01) | |

(52) U.S. Cl.
CPC .............. *G06F 16/26* (2019.01); *F24F 11/65* (2018.01); *G05B 19/042* (2013.01); *G06F 16/28* (2019.01); *G06F 16/444* (2019.01); *G05B 2219/2614* (2013.01)

(58) Field of Classification Search
CPC ........ G06F 16/26; G06F 16/28; G06F 16/444; F24F 11/65; G05B 19/042; G05B 2219/2614
See application file for complete search history.

(56) References Cited

U.S. PATENT DOCUMENTS

| | | | |
|---|---|---|---|
| 2010/0286843 A1 | 11/2010 | Lyon | |
| 2012/0283881 A1 | 11/2012 | Federspiel | |
| 2015/0338281 A1* | 11/2015 | Ross | ..................... G06F 11/301 236/44 A |

(Continued)

OTHER PUBLICATIONS

International Search Report and Written Opinion received in International Application No. PCT/US2020/049758, dated Jan. 26, 2021, 9 pages.

(Continued)

*Primary Examiner* — Sherrod L Keaton
(74) *Attorney, Agent, or Firm* — Kilpatrick Townsend & Stockton LLP (57) ABSTRACT

Embodiments determine the effect of an environmental maintenance device on other environmental maintenance devices in environmentally controlled space. The determined effects may be modeled and graphically represented using, for example, an effectiveness map. In the case of a data center, an exemplary effectiveness map may illustrate the effect that one or more computer room air conditioners (CRACs) have on themselves and on other CRACs in the data center. In the case of an office building, an exemplary effectiveness map may illustrate the effect that one or more selected variable air volume (VAV) terminal units have on their own thermostat readings and the thermostat readings of other VAV terminal units in the office building.

18 Claims, 5 Drawing Sheets

(56) References Cited

U.S. PATENT DOCUMENTS

2017/0046640 A1\* 2/2017 Varadi ............... G06Q 10/0635
2017/0070842 A1 3/2017 Kulp
2018/0012423 A1 1/2018 Dina
2019/0032942 A1 1/2019 Willmott et al.

OTHER PUBLICATIONS

Laput, et al. "Synthetic Sensors: Towards general-purpose sensing." In: Proceedings of the 2017 CHI Conference on Human Factors Computing Systems. May 11, 2017 Retrieved on Nov. 7, 2020 from www.gierad.com/assets/supersensor/supersensor.pdf.
EP20861135.0, "Extended European Search Report", dated Oct. 10, 2022, 8 pages.

\* cited by examiner

EFFECTIVENESS MAPS

CROSS-REFERENCES TO RELATED APPLICATIONS

This application claims benefit under 35 U.S.C. § 119(e) to U.S. Provisional Patent Application No. 62/897,099 filed Sep. 6, 2019 and entitled "Effectiveness Maps", the disclosure of which is incorporated by reference herein in its entirety for all purposes.

BACKGROUND

Often times, values of a physical condition, such as temperature and humidity, of a space (e.g. homes, buildings, offices, computer rooms of data centers that contain large arrays of computers and servers) are controlled. To control the physical conditions, the space is provided with devices, including sensors and environmental maintenance modules, or just modules, capable of modifying one or more of the physical conditions. The modules have one or more adjustable components termed environmental actuators, or just actuators, which control how the modules operate.

Manufacturers typically provide environmental maintenance modules as integral units with built-in controllers and externally accessible and/or adjustable set points for the actuators. These modules are installed in the space to be environmentally controlled, or are at least are functionally connected to that space, for example by ductwork. The set points are selected by an administrator (such as personnel, the data center operations personnel, administrator, owner, decision maker, equipment installer, or similar) to best maintain desired physical conditions in the managed space. The environmentally controlled space may include one or more sensors that read/measure values of one or more physical conditions and compare the readings/measurements to the set points of the actuators.

An environmental maintenance device (including environmental maintenance modules and sensor in a controlled space) may have an effect on other environmental maintenance devices in a same enclosed space (e.g. same room, same floor, same building, etc.). The effect of a given environmental maintenance device on other environmental maintenance devices may impact the other environmental maintenance modules' reach or maintain their respective set points. Current systems do not provide a technique for determining and/or visualizing the effect of a given environmental maintenance device on other environmental maintenance devices.

SUMMARY

Embodiments provide a method performed by a computer system. The method includes receiving historic data associated with a plurality of environmental maintenance devices provided in an environmentally controlled space over a period of time. The plurality of environmental maintenance devices includes a first environmental maintenance device and a second environmental maintenance device. The historic data associated with the plurality of environmental maintenance devices is aggregated. The method includes determining a first set of relationships among one or more of the plurality of environmental maintenance devices based on the aggregated historic data associated with the plurality of environmental maintenance devices. The computer system receives an input selecting at least one of the plurality of environmental maintenance devices as a selected environmental maintenance device. The method also includes identifying a subset of the first set of relationships based on the selected environmental maintenance device. The subset of the first set of relationships indicate an effect of the selected environmental maintenance device on remaining ones of the plurality of environmental maintenance devices or an effect of the remaining ones of the plurality of environmental maintenance devices on the selected environmental maintenance device. The method further includes generating a visual representation of the subset of the first set of relationships. The visual representation visually illustrates the effect of the selected environmental maintenance device on the remaining ones of the plurality of environmental maintenance devices or the effect of the remaining ones of the plurality of environmental maintenance devices on the selected environmental maintenance device. The visual representation is displayed on a display device.

Embodiments further provide a computer product comprising a non-transitory computer readable medium storing a plurality of instructions that, when executed, cause a computer to perform the method described above.

The plurality of instructions, when executed, further cause the computer to generate a graphical user interface including a list of the plurality of environmental maintenance devices. The input selecting at least one of the plurality of environmental maintenance devices is received via the graphical user interface. In some embodiments, the graphical user interface may include a list including all sets of relationships, and the input selecting the first set of relationships may be received via the graphical user interface.

Embodiments also provide an environmental maintenance system comprising a plurality of environmental maintenance devices; a computer that is communicatively linked with the plurality of environmental maintenance devices, and the computer product described above, and that is configured to execute the plurality of instructions of the computer product; and a display device communicatively linked with the computer for displaying the visual representation generated by the computer.

These and other embodiments of the disclosure are described in detail below. For example, other embodiments are directed to systems, devices, and computer readable media associated with methods described herein.

DETAILED DESCRIPTION

Embodiments determine the effect of an environmental maintenance device on other environmental maintenance devices (e.g. cooling devices, HVAC units, variable air volume (VAV) boxes, room sensors) in an environmentally controlled space (e.g. an office building floor, a data center). According to various embodiments, the determined effects may be modeled and graphically represented using, for example, an effectiveness map. In the case of a data center, an exemplary effectiveness map may illustrate the effect that one or more computer room air conditioners (CRACs) have on themselves and on other CRACs in the data center. In other words, the effectiveness map may illustrate the effect that the cooling action of one or more CRACs have on their temperature reading (e.g. the return air temperature, the supply/discharge air temperature), and on the temperature reading of other CRACs in the data center. The temperature readings of the CRACs may be measured using sensors that are coupled to (e.g. provided within or programmatically coupled to) the CRACs. In the case of an office building, an exemplary effectiveness map may illustrate the effect that one or more selected variable air volume (VAV) terminal units (or any other devices that control room temperature in a building) have on their own thermostat readings and the thermostat readings of other VAV terminal units in the office building.

A key difference between an influence map and effectiveness map is that an exemplary influence map shows the influence of one device (e.g., a CRAC unit) on a different kind of device (e.g., a data center rack). On the other hand, an exemplary effectiveness map shows the effect that devices of one type have on devices of the same type, including themselves. Another key difference is that the self-effect is programmatic: environmental maintenance devices automatically and programmatically react to their own temperature sensor by design. In some embodiments, the temperature sensor of an environmental maintenance device may be external to the environmental maintenance device (e.g. a variable air volume (VAV) box with a temperature sensor located separately from the environmental maintenance device but programmatically connected to the environmental maintenance device). An exemplary effectiveness map graphically illustrates a selected environmental maintenance device having the highest effect on itself, and having varying levels of effect on other environmental maintenance devices provided in the controlled space. However, in case of an influence map showing the influence of an environmental maintenance device on a server rack, a software must establish a relationship between an output of the environmental maintenance device and a temperature sensor coupled to the server rack. Otherwise, the environmental maintenance device will not automatically and programmatically react to server rack temperatures without a supervisory software coupled to the environmental maintenance devices.

I. Environmentally Controlled Space

Often enclosed physical spaces need to have various physical conditions maintained within certain desired ranges. Examples of such spaces include individual rooms, entire floors of an office building and computer server rooms at data centers. Examples of such physical conditions include temperature, pressure and humidity, pollution, pathogens among others.

Figure 1:
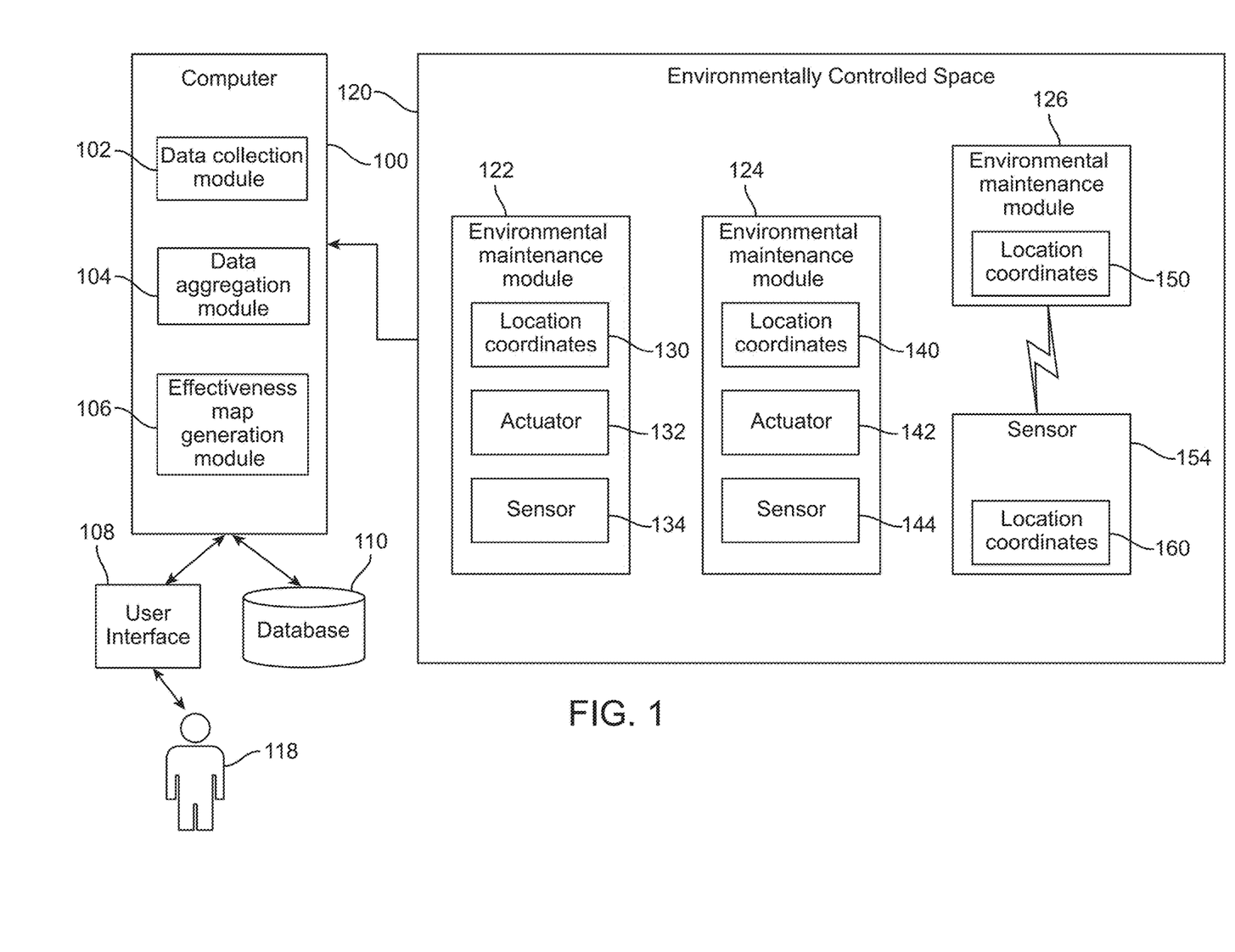
FIG. 1 illustrates a block diagram of a system for controlling an environmentally controlled space using a supervisory controller, according to an embodiment of the present invention.

FIG. 1 illustrates an exemplary environmental maintenance system, according to various embodiments. The exemplary environmental maintenance system may include an environmentally controlled space 120 comprising a plurality of environmental maintenance devices, a computer 100 communicatively linked with the plurality of environmental maintenance devices, and a display device 108 communicatively linked with the computer 100.

The plurality of environmental maintenance devices include environmental maintenance modules 122, 124, 126 (e.g. air handling units (AHUs), air conditioners (AC), cooling devices, HVAC units, variable air volume (VAV) boxes, Computer Room Air Conditioners (CRACs)), and sensors (such as sensor 154). According to various embodiments, the environmental maintenance modules may include a first environmental maintenance module 122 that supplies air of a predetermined air flow volume having a predetermined set of physical properties (e.g. temperature, humidity) to the environmentally controlled space 120. The air flow volume and the set of physical properties associated with the first environmental maintenance module 122 may affect environmental variables in the environmentally controlled space 120, and may have an effect of changing the air flow volume and the physical properties of a second environmental maintenance module 124 and/or 126 by virtue of the second environmental maintenance module's programming.

Exemplary environmental maintenance modules 122, 124 may each include an actuator 132, 142 (e.g. a fan, a valve, a pump, a generic positioning device) and a sensor 134, 144 (e.g. a temperature sensor, a humidity sensor, a pressure sensor). The actuators 132, 142 may each control a flow (e.g. air flow) through the respective module 122, 124. The modules 122, 124 have various adjustable components, such as fan speeds or valve settings, that function to affect the physical conditions. These components are controlled by values of actuators 132, 142, such as a voltage setting on a fan or a turn setting on a valve. The environmental maintenance modules 122, 124 may include a controller that controls actuator state variables in response to the one or more sensor values (e.g. to keep sensor value near a desired value).

An adjustable setting of an actuator is termed a 'state variable.' Examples of state variables include fan voltages and valve settings; the term 'actuator value' is used herein to refer to specific values of state variables. Actuator values may include Boolean values, including 'on' or 'off', real number values, hexadecimal values, percent of a possible range (e.g. 50% for valve opening) or other forms of data values. When it is clear from context, the terms 'state variable' and 'actuator value' may be used interchangeably. According to various embodiments, a given state variable may have a setpoint (e.g. desired setpoint), which is a defined target value for the state variable where the actuator value is changed dynamically to meet the desired setpoint.

Other exemplary environmental maintenance modules (such as environmental maintenance module 126) may not include an actuator and/or a sensor. The environmental maintenance module 126 may be configured to change its supply air flow/properties in response to environmental sensor readings of external sensors (such as sensor 154) that are associated with the environmental maintenance module 126 in a programmatic way. The standalone sensor 154 is an environmental maintenance device that is configured to measure a physical property of the environmentally controlled space 120 or other environmental maintenance devices such as the environmental maintenance module 126.

According to various embodiments, the environmental maintenance modules 122, 124, 126 are not configured to respond to environmental sensor readings that are associated with other environmental maintenance modules 122, 124, 126. For example, the environmental maintenance module 122 may not respond to the readings of the sensors 144 or 154. However, sensors 144 and 154 may be impacted by an output of the environmental maintenance module 122. That is, the environmental maintenance module 122 will have an effect on the environmental maintenance modules 124, 126 which will be captured by sensors 144, 154, respectively.

Environmental maintenance modules (e.g. module 122) may have programmatic behaviors that are functionally isolated from programmatic behaviors of other environmental maintenance modules (e.g. modules 124, 126). In some embodiments, a supervisory controller may embody the isolated programmatic behaviors for each environmental maintenance module 122, 124, 126. For example, the supply air of a first environmental maintenance module (e.g. computer room air handler (CRAH)) may have an effect on the return air to a second environmental maintenance module. The second environmental maintenance module may adjust its supply air conditioning in response, but the programmatic behaviors that define the response may be native to the second environmental maintenance module without regard to the other environmental maintenance modules (e.g. the response may still remain when the second environmental maintenance module is not connected to the supervisory controller via a communication network) and/or be implemented on a supervisory controller.

According to various embodiments, the environmental maintenance devices 122, 124, 126, 154 may be spread out within the environmentally controlled space 120. In some embodiments, each device 122, 124, 126, 154 may be assigned a specific location, and hence be associated with specific location information 130, 140, 150, 160 (e.g. coordinates of the devices in the space, or designated physical location of the devices on a floorplan of the space). Given a map of the environmentally controlled space 120, the devices 122, 124, 126, 154 in the environmentally controlled space 120 may be placed on the map based on the respective location coordinates 130, 140, 150, 160.

A computer 100 may be communicatively linked with some or all of the sensors 122, 124, 126, 154 and/or actuators 132, 142 in the environmentally controlled space 120. The computer 100 may include a general purpose computer, an application specific integrated circuit (ASIC) or a field programmable gate array (FPGA). The computer 100 may be communicatively coupled to a display device 108 that may display a user interface (UI) through which a user 118 may select one of the environmental maintenance modules to learn the effect that the selected environmental maintenance module has on other environmental maintenance modules and/or sensors in the environmentally controlled space 120.

According to various embodiments, the computer 100 may receive, via a data collection module 102, historic data associated with the environmental maintenance devices 122, 124, 126, 154 provided in the environmentally controlled space 120 over a period of time. The computer 100 may store the received historic data in a database 110. As used herein, the received data may include sensor measurements (e.g. temperature, humidity, pressure) received from the sensors 134, 144, 154, actuator state variables associated with actuators 132, 142 as well as calculated data that is determined using the sensor measurements and/or actuator state variables, such as a heat transfer rate, an airflow rate or a latent heat transfer rate of the environmental maintenance modules 122, 124, 126. One kind of heat transfer rate of a VAV box may be defined as the flow rate through the VAV box times the difference between the air temperature supplied by the VAV box and the temperature of the zone it serves, specifically the temperature of its thermostat. One kind of latent heat transfer rate may be defined as the airflow rate times the difference between the humidity ratio of the air supplied by the VAV box and the humidity ratio of the zone it serves.

The computer 100 may aggregate, via a data aggregation module 104, the historic data associated with the environmental maintenance devices. The computer 100 may receive the historic data over a period of time. Thus, the computer 100 may know how a given device functions over time, and may identify correlations between the given device's operation and operation of the remaining devices. The computer 100 may determine relationships (e.g. heat transfer rate, airflow rate or latent heat transfer rate) among one or more of the environmental maintenance devices based on the aggregated historic data. The relationships may include an effect to a given environmental maintenance device on other environmental maintenance devices. For example, if the relationship is heat transfer rate, the computer may determine the effect that a first environmental maintenance device has on the heat transfer rate of one or more other environmental maintenance devices. For example, an output air flow of the first environmental maintenance device may affect the heat transfer rate of the other environmental maintenance devices. The computer 100 may quantify the effect using a numeric value (e.g. a score).

According to various embodiments, the determined relationships may include a relationship between the actuator 132 (and/or a state variable such as supply air temperature, etc.) of first environmental maintenance module 122 and the sensor 134 of the first environmental maintenance module 122 (i.e. the relationship of first device to itself), the actuator 142 (and/or state variable) of second environmental maintenance module 124 and the sensor 144 of the second environmental maintenance module 124 (i.e. relationship of second device to itself), and/or a relationship between the first environmental maintenance module 122 and the second environmental maintenance module 124.

The computer 100 may then generate a visual representation (e.g. a table, a graph, a map, a message including alphanumerical characters and/or symbols, a graphical representation) of all or a subset of the determined relationships. For example, the computer 100 may generate, via an effectiveness map generation module, an effectiveness map illustrating the effect of the environmental maintenance devices on each other. For example, the computer 100 may receive, for example via a user interface displayed on the display device 108, an input selecting one plurality of environmental maintenance devices as a selected environmental maintenance device. The computer 100 may then filter the determined relationships to identify a subset indicating an effect of the selected environmental maintenance device on remaining ones of the environmental maintenance devices. For example, if the computer 100 receives an input selecting the module 122, the computer 100 may then identify the effect for the particular relationship (e.g. heat transfer rate) of the selected module 122 on remaining devices 124, 126, 154. The visual representation may be displayed on the display device 108.

According to various embodiments, the computer 100 may store an electronic map of the environmentally controlled space 120 at a storage. The computer 100 may also receive the location coordinates 130, 140, 150, 160 associated with the devices 122, 124, 126, 154. The computer 100 may then generate an effectiveness map representing the devices 122, 124, 126, 154 on the electronic map, and showing the effect of selected device(s) on the remaining devices using various visual cues, such as colors, size/shape/transparency of objects, symbols (e.g. numbers, letters), etc.

that are overlaid on the electronic map. The visual cues associated with an effectiveness map are discussed in greater detail in connection with FIGS. 2 and 3. The effectiveness map may be incorporated in the visual representation displayed on the display device.

II. Effectiveness Maps

Figure 2:
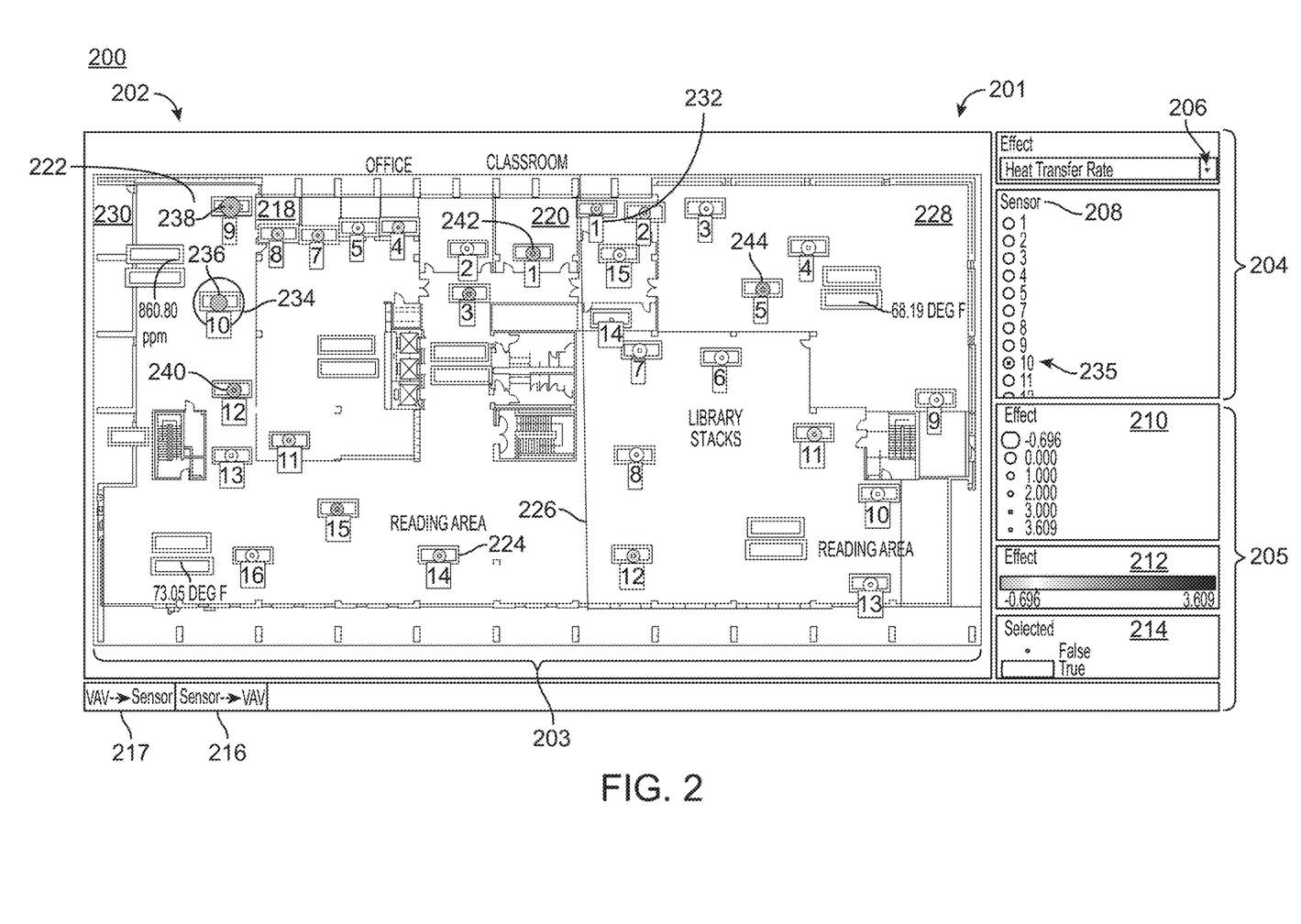
FIG. 2 illustrates an exemplary effectiveness map illustrating effects of environmental maintenance modules on a selected sensor in an environmentally controlled space, according to embodiments of the present disclosure.
Figure 3:
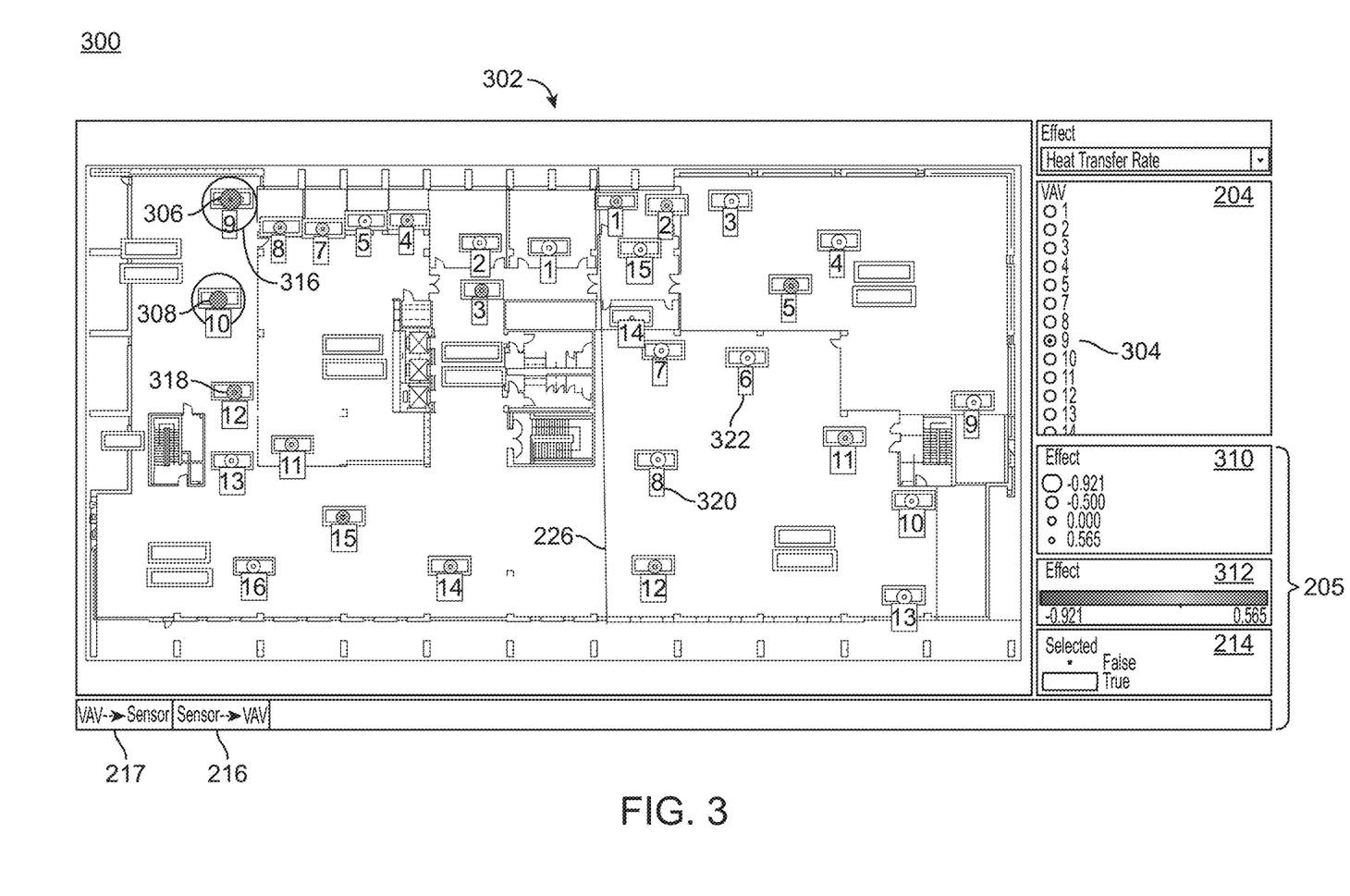
FIG. 3 illustrates an exemplary effectiveness map illustrating effect of a selected environmental maintenance module on sensors in an environmentally controlled space, according to embodiments of the present disclosure.

FIGS. 2 and 3 illustrate exemplary effectiveness maps for a building according to various embodiments. FIGS. 2 and 3 illustrate different views associated with an exemplary GUI 200. Each view includes an exemplary effectiveness map that illustrate a different relationship between a selected environmental control device and other environmental control devices in an environmentally controlled space. The first view is accessed using a first tab 216 of the GUI 200 and illustrates an effectiveness map 202 showing the effect of a plurality of environmental devices (e.g. VAV boxes) on one or more selected sensor(s) in the environmentally controlled space. The first view is illustrated in FIG. 2. The second view is accessed using a second tab 217 of the GUI 200 and illustrates an effectiveness map 302 showing the effect of one or more selected environmental devices (e.g. VAV box(es)) on other environmental control devices in the environmentally controlled space. The second view is illustrated in FIG. 3.

The building map 201 illustrated in FIGS. 2 and 3 may be a large building, for example on a college campus, with offices spaces 218, classrooms 220, communal areas such as library stacks 222, reading area 224. A plurality of environmental control devices 232 may have been spread throughout the building. The devices may be numbered (as shown in the effectiveness maps 202 and 203) for ease of reference.

FIGS. 2-3 illustrate a partition 226 that separates the space into two separate environmentally controlled spaces (e.g. subspaces). In some embodiments, the partition 226 may be a physical partition that has been added after the building has been built (e.g. a tenant addition). In some embodiments, the partition 226 may represent a virtual partition illustrating air spaces that are designed to be served by different air handles. In FIGS. 2-3, the partition 226 may separate the building into two separate environmentally controlled spaces 228, 230. The devices in the first space 228 may be numbered 1-16 and the devices in the second space 230 may be numbered 1-15. In the exemplary controlled space illustrated in FIGS. 2 and 3, a first air handler may be feeding all of the devices 1-16 in the first space 228 and a second air handler may be feeding all of the devices 1-15 of the second space 230. Effectiveness maps described herein may identify crosstalk between devices fed by a same air handler within the first space 228 or the second space 230. The effectiveness maps may also identify crosstalk between devices fed by different air handlers, provided in the first space 228 and the second space 230. Often times, tenant addition partitions (such as partition 226) may create environmental control inefficiencies in a building. Effectiveness maps discussed herein may help to identify and remedy such inefficiencies.

The environmental maintenance devices provided in the building may include cooling or heating units that are regulating temperatures in respective areas 218, 220, 222, 224. The devices may include one or more variable air volume (VAV) boxes that are in the air distribution system downstream of air handlers, as well as sensors (internal or external) associated with the VAV boxes. Icons on the effectiveness maps 202 and 302 may represent the VAV boxes as well as their sensors (e.g. sensors physically or programmatically coupled to the VAV boxes). For example, a VAV box may be located in the ceiling and a sensor may be affixed to a wall in the vicinity of the VAV box. The VAV boxes adjust the air flow rate and have a temperature set point setting that reacts to the temperature in the space. The VAV boxes may be configured to keep the temperature set point close to a predetermined set point (e.g. 72 degrees Fahrenheit). As shown in FIGS. 2 and 3, each office space 218 may be provided with their own thermostat, which may be programmatically connected to a VAV terminal unit. When the temperature in the office space 218 changes, the associated VAV terminal unit reacts to the temperature change to try to keep the temperature close to the preset temperature (e.g. temperature set by the occupant or the building manager) or a preset temperature range.

The graphical user interface (GUI) 200 illustrated in FIGS. 2 and 3 includes a first section 203 for displaying a visual representation of effect that one device has on the other devices (e.g. the effectiveness map 202). The GUI also has a second section 204 for receiving a user input, and a third section 205 for providing a map legend to explain various visual cues used in the first section 203.

The second section 204 may provide a first group of one or more user input controls 206 for the user to select an effect (e.g. a relationship) that should be graphically illustrated in the first section 203. Exemplary effects or relationships may include a heat transfer rate, an airflow rate or a latent heat transfer rate. The second section 204 includes a second group of one or more user input controls 208 to allow the user to select a device (e.g. one of the sensors internal or external to VAV boxes) shown in the effectiveness maps 202 or 302. One of ordinary skill in the art understands that user controls 206, 208 shown in FIGS. 2-3 are for illustration purposes only and should not be construed as limiting. Exemplary user controls may include, but is not limited to, checkboxes, radio buttons, dropdown lists, list boxes, buttons, toggles, text fields, or data fields.

A. Effectiveness Map Showing Effect of Environmental Maintenance Devices on a Selected Environmental Maintenance Device Referring now only to FIG. 2, the user selects the sensor 10 as the selected device 235 using the user input controls in the second section 204. Once the user identifies a selected device, the device on the map is visually identified. For example, in FIG. 2, the sensor no. 10 is the selected device 235 and is illustrated with a selection tool (e.g. circle) 234 around it on the map 202. The effectiveness map 202 illustrates the effect of the reaming devices 232 (e.g. VAV boxes) on the selected device 235 (e.g. the sensor no. 10). The value of the effect may be illustrated using visual cues (e.g. color and/or size of the icon illustrating the effect). A map legend or key may be provided in a third section 205 of the GUI 200. The third section 205 may include a numeric value of the effect illustrated by various sizes 210 of the icons associated with the devices, a numeric value of the effect illustrated by various colors 212 of the icons associated with the devices, and a visual cue 214 illustrating which device(s) are selected. Accordingly, the third section 205 may provide an explanation of the visual cues (e.g. symbols, colors) used on the effectiveness map 202.

The effectiveness map 202 may illustrate the effect of the VAV boxes on the selected device 235 (e.g. the sensor no. 10). The selected device 235 has the highest effect on itself. For example, the sensor no. 10 reads the highest reading for the VAV box associated with the sensor no. 10. Other devices (e.g. VAV boxes) in the building may have effect of varying degrees on the selected device 235. The two devices 238 and 240 closer to the selected device 235 may have the next highest effect on the selected device 235. The round icons representing the effect of the devices 238, 240 are smaller than the round icon 236 representing the effect of the selected device 235 on itself. The third section 205 of the GUI 200 includes a numeric value associated with various sizes of the round icons used in the effectiveness map 202. The effectiveness map 202 may be used to control the various devices in the building in a more efficient manner. For example, knowing the effect of other devices on the selected device may be used to modify the setpoints associated with the selected device as well as on/off state of the selected device.

The effectiveness map 202 shows that devices 242 and 244 that are provided away from the selected device 235 and within different enclosed areas may have an effect on the selected device 235. This may indicate an inefficiency in the environmental management of the building, an error with one or more of the devices 235, 242, 244, an incorrect tenant addition 226, or another problem with the building. In addition, as explained above, the selected device 235 has the highest effect on itself. If the shown effect for the selected device is not the highest illustrated on the effectiveness map, a problem associated with the selected device may be identified. Accordingly, the effectiveness map 202 may be also used for diagnostics and fault detection purposes.

As provided above, the GUI 200 includes different views that can be accessed using the tabs 216, 217 illustrated at the bottom of the first section 203 of the GUI 200. The effectiveness map 202 accessed via selecting the first tab 216 is discussed above in connection with FIG. 2. The effectiveness map 302 accessed via selecting the second tab 217 is discussed next, in connection with FIG. 3. The tabs shown in FIG. 3 are for illustrative purposes only and should not be construed as limiting. One of ordinary skill in the art appreciates that the different views can be presented using other means, such as different documents, different media formats (e.g. message, email), in response user commands (e.g. voice commands, tactile commands, selection on GUI). The GUI 200 is not limited as shown in FIG. 3 and according to some embodiments, the GUI 200 may represent a single view.

B. Effectiveness Map Showing Effect of a Selected Environmental Maintenance Device on Other Environmental Maintenance Devices FIG. 3 illustrates an effectiveness map 302 showing the effect of selected VAV box(es) on sensors in the building. The effectiveness map 302 includes similar building elements as effectiveness map 202, which are discussed above in connection with FIG. 2. The description of identical items is omitted here.

The second section 204 of the GUI 200 includes a second group of one or more user input controls 208 to allow the user to select a device (e.g. one of the VAV boxes) shown in the map 302. In the exemplary tab 217 of the GUI 200 shown in FIG. 3, the user selects the VAV box 9 as the selected device 304.

Once the user identifies a selected device, the device on the map is visually identified. For example, in FIG. 3, the VAV box no. 9 is the selected device 304 and is illustrated with a selection tool (e.g. circle) 316 around it on the map 302. The effectiveness map 302 illustrates the effect of the selected device 304 (e.g. the VAV box no. 9) on other devices (e.g. sensors and/or VAV boxes). The value of the effect may be illustrated using visual cues (e.g. color and/or size of the icon illustrating the effect). A map legend or key may be provided in a third section 205 of the GUI 200. The third section 205 may include a numeric value of the effect illustrated by various sizes 310 of the icons associated with the devices, a numeric value of the effect illustrated by various colors 312 of the icons associated with the devices, and a visual cue 314 illustrating which device(s) are selected. Accordingly, the third section 205 may provide an explanation of the visual cues (e.g. symbols, colors) used on the effectiveness map 302.

The effectiveness map 302 may illustrate the effect of the selected device 304 (e.g. the VAV box no. 9) on other devices (e.g. sensors and/or VAV boxes). The selected device 304 has the highest effect on itself. For example, the VAV box no. 9 reads the highest heat transfer rate for itself. The VAV box no. 9 may affect the heat transfer rate of the other devices (e.g. VAV boxes) in the building. For example, the heat transfer rate of the two devices 308 and 318 closer to the selected device 304 may be affected from the selected device 304. The round icons representing the effect of the selected device 304 on the devices 308, 318 are smaller than the round icon 306 representing the effect of the selected device 304 on itself. The third section 205 of the GUI 200 includes a numeric value associated with various sizes of the round icons used in the effectiveness map 302. The effectiveness map 302 may be used to control the various devices in the building in a more efficient manner. For example, knowing the effect of other devices on the selected device may be used to modify the setpoints associated with the selected device as well as on/off state of the selected device.

For example, the VAV box no. 9 may be provided in the ceiling and may be blowing cold air at its own sensor located in vicinity of the VAV box no. 9. In some instances, the VAV box no. 9 may also be blowing cold air on a sensor far away in the room, e.g. sensor number 10, therefore creating a crosstalk.

The effectiveness map 302 shows that the selected device 304 has an effect (e.g. crosstalk) on devices 320 and 322 that are provided away from the selected device 304 and in a separate area partitioned from the area containing the selected device 304. This may indicate an inefficiency in the environmental management of the building, an error with one or more of the devices 304, 320, 322, an incorrect placement of the partition 226, a deviation from original heating, ventilation and air conditioning (HVAC) room design conditions, and/or another problem with the building. In addition, as explained above, the selected device 304 has the highest effect on itself. If the shown effect for the selected device is not the highest illustrated on the effectiveness map, a problem associated with the selected device may be identified. Accordingly, the effectiveness map 302 may be also used for diagnostics and fault detection purposes.

The effectiveness maps are not limited to the maps shown in FIGS. 2 and 3, and can be in any graphical form. For example, the effectiveness map may be in form of a table. The function values may be represented by a square array of the same size as the number of devices, where each row, column, or diagonal is uniquely associated with a device and each element of the row, column, diagonal is uniquely associated with a device. A user may select a device, and the selection may cause the function values from one of the associated row, column, diagonal to be displayed as a symbolic representation at the associated locations. The numerical relationships may be represented as a first square array and the functions may be represented by a second square array, where the second square array is computed as the elementwise product of the first array and the transpose of the inverse of the first array (e.g. relative gains array).

According to various embodiments, a design principal for all of the environmental control devices in a controlled space may require each device to primarily have an effect on itself and not on other devices. However, in some setups, a given device may have an effect on other devices (e.g. there may be cross-talk between devices), as shown in the effectiveness maps illustrated in FIGS. 2 and 3. The effectiveness maps may assist in identifying mechanical problems associated with a given device (e.g. problems with a valve or a damper of the device). In other embodiments, a tenant improvement (such as the partition 226 illustrated in FIGS. 2-3) may divide a space in two sub-spaces and intentionally disrupt the zoning of the space that was intended by the original design. The effectiveness maps may assist in identifying anomalies and errors that can happen over time. According to various embodiments, the presence or absence of reasonably expected cross talk may also indicate that the floorplan is not a good representation of the real space (e.g. that there is deviation from original HVAC room design conditions due to, for example, a tenant modification).

C. Method of Generating Effectiveness Maps

Figure 4:
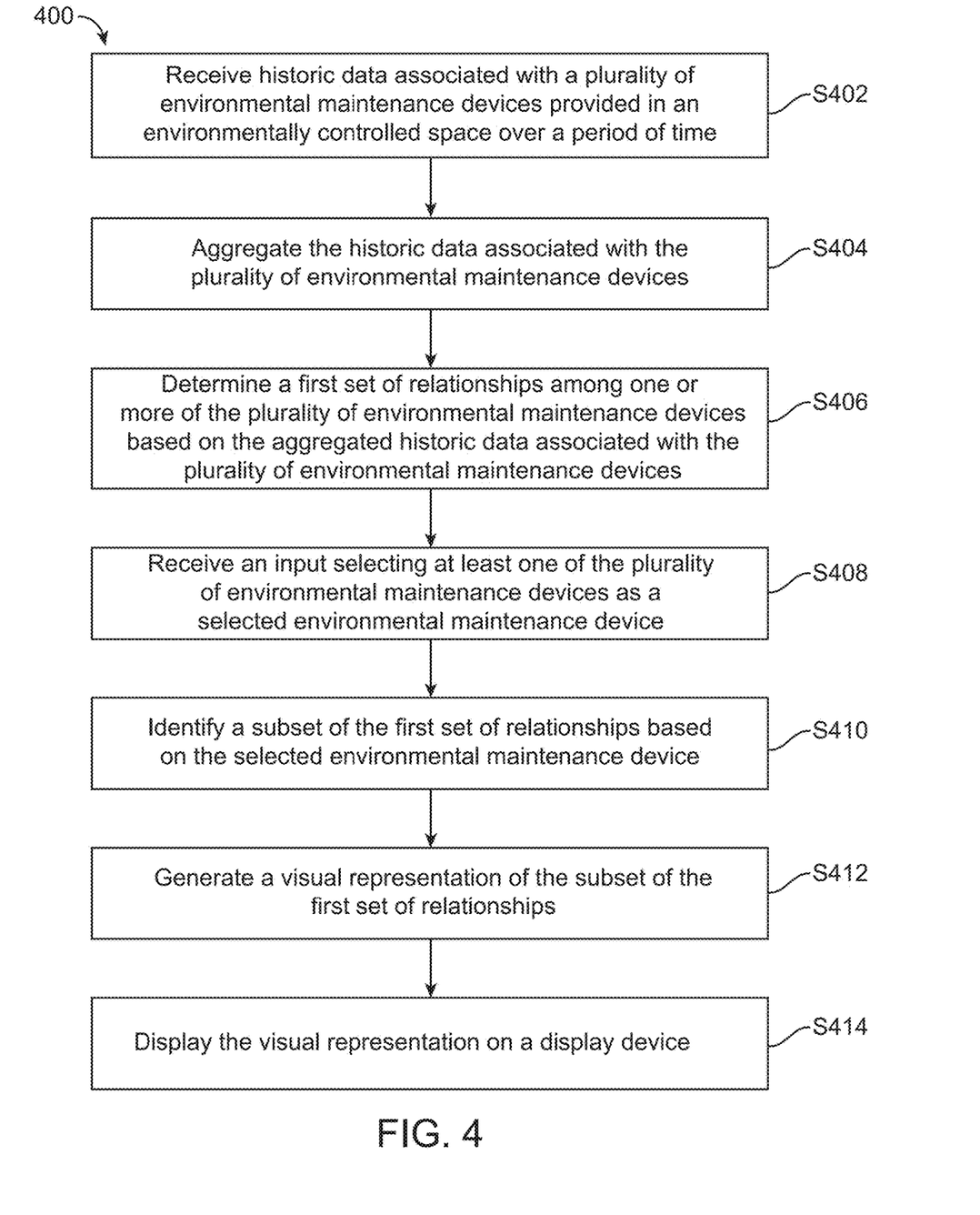
FIG. 4 is a flow chart of a method of generating one or more effectiveness maps in an environmentally controlled space, according to an embodiment of the present invention.

FIG. 4 illustrates a flow chart 400 of a method of generating one or more effectiveness maps in an environmentally controlled space, according to an embodiment of the present invention.

A computer may be coupled to a plurality of environmental maintenance devices provided in an environmentally controlled space. At step S402, the computer may receive historic data associated with the plurality of environmental maintenance devices over a period of time. The plurality of environmental maintenance devices may include a first environmental maintenance device and a second environmental maintenance device. According to various embodiments, the environmental maintenance devices may include one or more sensors, and one or more environmental maintenance modules. An exemplary environmental maintenance module may include its own actuator and/or sensor.

According to various embodiments, the historic data associated with the first environmental maintenance device includes measured or calculated data associated with the first environmental maintenance device over the period of time. For example, the historic data may include sensible heat transfer rate, which is calculated using measured data such as discharge airflow rate, discharge temperature, and zone temperature from associated sensors. The historic data may also include discharge airflow rate, which is calculated using measured data from a differential pressure sensor. The historic data may include latent heat transfer rate, which is calculated using measured data such as discharge airflow rate, discharge humidity ratio, and zone humidity ratio. Similarly, the historic data associated with the second environmental maintenance device may include measured or calculated data associated with the second environmental maintenance device over the period of time.

The historic data is associated with a dynamic state of the environmentally controlled space. For example, the environmental control devices (e.g. VAV boxes) provided in the space may constantly adjust their flow rates, for example by closing and opening their dampers. Accordingly, the received historic data is associated with a dynamic system. Therefore, the history data may be used for reinforcement learning in connection with AI implementations of the techniques described herein.

At step S404, the computer may aggregate the historic data associated with the plurality of environmental maintenance devices. For example, the computer may receive historic data for a couple of weeks or months, and may combine several measurements over the course of weeks or months.

At step S406, the computer may determine a first set of relationships among one or more of the plurality of environmental maintenance devices based on the aggregated historic data associated with the plurality of environmental maintenance devices. The computer may also determine additional relationships among the plurality of environmental maintenance devise. Exemplary relationships may include a heat transfer rate, an airflow rate and a latent heat transfer rate.

According to various embodiments, the computer may generate a mathematical effectiveness model. Coefficients of the model may be determined based on the historic data to match the behavior of the environmental maintenance devices and the sensors associated with the environmental maintenance devices. For example, the effectiveness model may be a linear model that relates the amount of heat removed or introduced into the space by an environmental maintenance devices to the temperature data provided by the sensors in the space. In this exemplary embodiments, the linear model may use the heat transfer as the input and the thermostat temperature sensor readings as the outputs. The effectiveness model is not limited to linear model and may include other models, such as a deep neural network model.

At step S408, the computer may receive an input selecting at least one of the plurality of environmental maintenance devices as a selected environmental maintenance device. In some embodiments, the computer may generate a graphical user interface including a list of the environmental maintenance devices. The input selecting at least one of the plurality of environmental maintenance devices may be received via the graphical user interface. In some embodiments, the graphical user interface may also include a list including all sets of relationships determined by the computer. The graphical user interface may also enable a user to select the first set of relationships.

At step S410, the computer may identify a subset of the first set of relationships based on the selected environmental maintenance device. For example, the first set of relationships may include the heat transfer rate effect of each environmental maintenance device on reaming environmental maintenance devices. The subset of the first set of relationships may include the heat transfer rate effect of the selected environmental maintenance device on remaining environmental maintenance devices, or the heat transfer rate effect of the remaining environmental maintenance devices on the selected environmental maintenance device. That is, the subset of the first set of relationships indicate an effect of the selected environmental maintenance device on remaining ones of the plurality of environmental maintenance devices or an effect of the remaining ones of the plurality of environmental maintenance devices on the selected environmental maintenance device.

At step S412, the computer may generate a visual representation of the subset of the first set of relationships. The visual representation may include a graph, a map, a table, a message including alphanumerical characters and/or symbols, etc. The visual representation visually illustrates the effect of the selected environmental maintenance device on the remaining ones of the plurality of environmental maintenance devices or the effect of the remaining ones of the plurality of environmental maintenance devices on the selected environmental maintenance device.

At step S414, the computer may display the visual representation or the graphical user interface including the visual representation on a display device.

In some embodiments, the input may select multiple environmental maintenance devices. In such embodiments, the computer may identify relationships between the selected environmental maintenance devices and remaining environmental maintenance devices as the subset of the first set of relationships. The visual representation represents a collective effect of the selected environmental maintenance devices on the remaining environmental maintenance devices.

III. Computer System

Figure 5:
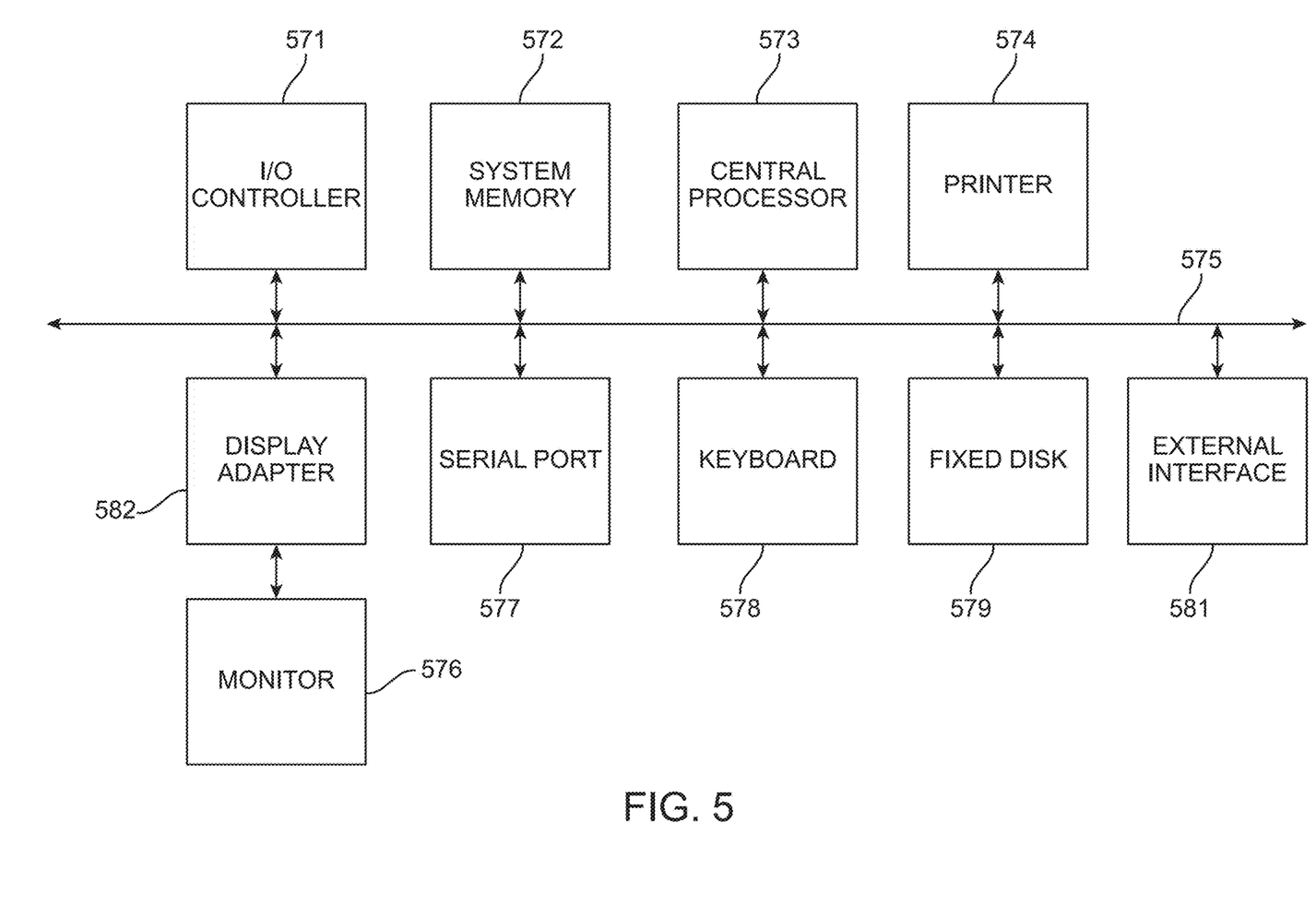
FIG. 5 shows a block diagram of an exemplary computer apparatus usable with systems and methods according to embodiments of the present invention.

Any of the computer systems mentioned herein may utilize any suitable number of subsystems. Examples of such subsystems are shown in FIG. 5 in computer apparatus 500. In some embodiments, a computer system includes a single computer apparatus, where the subsystems can be the components of the computer apparatus. In other embodiments, a computer system can include multiple computer apparatuses, each being a subsystem, with internal components.

The subsystems shown in FIG. 5 are interconnected via a system bus 575. Additional subsystems such as a printer 574, keyboard 578, fixed disk 579, monitor 576, which is coupled to display adapter 582, and others are shown. Peripherals and input/output (I/O) devices, which couple to I/O controller 571, can be connected to the computer system by any number of means known in the art, such as serial port 577. For example, serial port 577 or external interface 581 (e.g. Ethernet, Wi-Fi, etc.) can be used to connect computer system 500 to a wide area network such as the Internet, a mouse input device, or a scanner. The interconnection via system bus 575 allows the central processor 573 to communicate with each subsystem and to control the execution of instructions from system memory 572 or the fixed disk 579, as well as the exchange of information between subsystems. The system memory 572 and/or the fixed disk 579 may embody a computer readable medium. Any of the values mentioned herein can be output from one component to another component and can be output to the user.

A computer system can include a plurality of the same components or subsystems, e.g., connected together by external interface 581 or by an internal interface. In some embodiments, computer systems, subsystem, or apparatuses can communicate over a network. In such instances, one computer can be considered a client and another computer a server, where each can be part of a same computer system. A client and a server can each include multiple systems, subsystems, or components.

It should be understood that any of the embodiments of the present invention can be implemented in the form of control logic using hardware (e.g. an application specific integrated circuit or field programmable gate array) and/or using computer software with a generally programmable processor in a modular or integrated manner. Based on the disclosure and teachings provided herein, a person of ordinary skill in the art will know and appreciate other ways and/or methods to implement embodiments of the present invention using hardware and a combination of hardware and software.

Any of the software components or functions described in this application may be implemented as software code to be executed by a processor using any suitable computer language such as, for example, Java, C++ or Perl using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. The computer readable medium may record the data in a non-transitory physical medium. Computer readable media encoded with the program code may be packaged with a compatible device or provided separately from other devices (e.g., via Internet download). Any such computer readable medium may reside on or within a single computer program product (e.g. a hard drive, a CD, or an entire computer system), and may be present on or within different computer program products within a system or network. A computer system may include a monitor, printer, or other suitable display for providing any of the results mentioned herein to a user.

Any of the methods described herein may be totally or partially performed with a computer system including a processor, which can be configured to perform the steps. Thus, embodiments can be directed to computer systems configured to perform the steps of any of the methods described herein, potentially with different components performing a respective steps or a respective group of steps. Although presented as numbered steps, steps of methods herein can be performed at a same time or in a different order. Additionally, portions of these steps may be used with portions of other steps from other methods. Also, all or portions of a step may be optional. Additionally, any of the steps of any of the methods can be performed with modules, circuits, or other means for performing these steps.

The specific details of particular embodiments may be combined in any suitable manner without departing from the spirit and scope of embodiments of the invention. However, other embodiments of the invention may be directed to specific embodiments relating to each individual aspect, or specific combinations of these individual aspects.

The above description of exemplary embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated.

A recitation of "a", "an" or "the" is intended to mean "one or more" unless specifically indicated to the contrary. The use of "or" is intended to mean an "inclusive or," and not an "exclusive or" unless specifically indicated to the contrary. Reference to a "first" component does not necessarily require that a second component be provided. Moreover, reference to a "first" or a "second" component does not limit the referenced component to a particular location unless expressly stated. The term "based on" is intended to mean "based at least in part on."

All patents, patent applications, publications, and descriptions mentioned above are herein incorporated by reference in their entirety for all purposes. None is admitted to be prior art.

What is claimed is:

1. A method comprising performing by a computer system:
receiving historic data associated with a plurality of environmental maintenance devices provided in an environmentally controlled space over a period of time, wherein the plurality of environmental maintenance devices includes a first environmental maintenance device and a second environmental maintenance device;
aggregating the historic data associated with the plurality of environmental maintenance devices;
determining a first set of relationships among one or more of the plurality of environmental maintenance devices based on the aggregated historic data associated with the plurality of environmental maintenance devices;
receiving an input selecting at least one of the plurality of environmental maintenance devices as a selected environmental maintenance device;
identifying a subset of the first set of relationships based on the selected environmental maintenance device, wherein the subset of the first set of relationships indicate:
an effect of the selected environmental maintenance device on remaining ones of the plurality of environmental maintenance devices, or
an effect of the remaining ones of the plurality of environmental maintenance devices on the selected environmental maintenance device,
wherein the selected environmental maintenance device and the remaining ones of the plurality of environmental maintenance devices are of a same type;
generating a visual representation of the subset of the first set of relationships, wherein the visual representation visually illustrates the effect of the selected environmental maintenance device on the remaining ones of the plurality of environmental maintenance devices or the effect of the remaining ones of the plurality of environmental maintenance devices on the selected environmental maintenance device, wherein the visual representation visually illustrates any given environmental maintenance device having a first effect on itself, and having varying levels of second effects on the remaining ones of the plurality of environmental maintenance devices that are of the same type as the given environmental maintenance device;
receiving, by the computer system, location information associated with respective locations of the plurality of environmental maintenance devices;
storing an electronic map of the environmentally controlled space;
placing the plurality of environmental maintenance devices on the electronic map based on the location information associated with the plurality of environmental maintenance devices;
incorporating the electronic map in the visual representation; and
displaying the visual representation on a display device.

2. The method of claim 1, wherein
the historic data associated with the first environmental maintenance device includes measured or calculated data associated with the first environmental maintenance device over the period of time, and
the historic data associated with the second environmental maintenance device includes measured or calculated data associated with the second environmental maintenance device over the period of time.

3. The method of claim 1, wherein the first environmental maintenance device includes a first actuator and a first sensor,
the second environmental maintenance device includes a second actuator and a second sensor,
the first set of relationships include one or more of a relationship between the first actuator and the first sensor, a relationship between a state variable of the first actuator and the first sensor, a relationship between the second actuator and the second sensor, a relationship between a state variable of the second actuator and the second sensor, a relationship between the first actuator and the second sensor, or a relationship between the first sensor and the second actuator.

4. The method of claim 1, wherein the selected environmental maintenance device is the first environmental maintenance device, and the subset of the first set of relationships includes at least an effect of the first environmental maintenance device on itself and an effect of the first environmental maintenance device on the second environmental maintenance device.

5. The method of claim 1, wherein the input selecting at least one of the plurality of environmental maintenance devices includes two or more selected environmental maintenance devices, wherein the method further comprises;
identifying relationships between the selected two or more environmental maintenance devices and remaining ones of the plurality of environmental maintenance devices as the subset of the first set of relationships, wherein the visual representation represents a collective effect of the selected two or more environmental maintenance devices on the remaining ones of the plurality of environmental maintenance devices.

6. The method of claim 1, wherein the first set of relationships is represented on the visual representation using one or more visual cues.

7. The method of claim 1, further comprising:
determining a numeric value for each of the plurality of environmental maintenance devices representing the subset of the first set of relationships; and
displaying the numeric value with corresponding environmental maintenance device on the visual representation.

8. The method of claim 1, further comprising:
determining one or more additional sets of relationships among the one or more of the plurality of environmental maintenance devices based on at least the historic data associated with the plurality of environmental maintenance devices, wherein the first set of relationships and the one or more additional sets of relationships include a heat transfer rate, an airflow rate or a latent heat transfer rate.

9. A computer product comprising a non-transitory computer readable medium storing a plurality of instructions that, when executed, cause a computer to:
receive historic data associated with a plurality of environmental maintenance devices provided in an environmentally controlled space over a period of time, wherein the plurality of environmental maintenance devices includes a first environmental maintenance device and a second environmental maintenance device;
aggregate the historic data associated with the plurality of environmental maintenance devices;
determine a first set of relationships among one or more of the plurality of environmental maintenance devices based on the aggregated historic data associated with the plurality of environmental maintenance devices;

receive an input selecting at least one of the plurality of environmental maintenance devices as a selected environmental maintenance device;

identify a subset of the first set of relationships based on the selected environmental maintenance device, wherein the subset of the first set of relationships indicate:

an effect of the selected environmental maintenance device on remaining ones of the plurality of environmental maintenance devices, or an effect of the remaining ones of the plurality of environmental maintenance devices on the selected environmental maintenance device, wherein the selected environmental maintenance device and the remaining ones of the plurality of environmental maintenance devices are of a same type;

generate a visual representation of the subset of the first set of relationships, wherein the visual representation visually illustrates the effect of the selected environmental maintenance device on the remaining ones of the plurality of environmental maintenance devices or the effect of the remaining ones of the plurality of environmental maintenance devices on the selected environmental maintenance device, wherein the visual representation visually illustrates any given environmental maintenance device having a first effect on itself, and having varying levels of second effects on the remaining ones of the plurality of environmental maintenance devices that are of the same type as the given environmental maintenance device;

receive location information associated with respective locations of the plurality of environmental maintenance devices;

store an electronic map of the environmentally controlled space;

place the plurality of environmental maintenance devices on the electronic map based on the location information associated with the plurality of environmental maintenance devices;

incorporate the electronic map in the visual representation; and display the visual representation on a display device.

10. The computer product of claim 9, wherein the historic data associated with the first environmental maintenance device includes measured or calculated data associated with the first environmental maintenance device over the period of time, and the historic data associated with the second environmental maintenance device includes measured or calculated data associated with the second environmental maintenance device over the period of time.

11. The computer product of claim 10, wherein the first environmental maintenance device includes a first actuator and a first sensor, the second environmental maintenance device includes a second actuator and a second sensor, the first set of relationships include one or more of a relationship between the first actuator and the first sensor, a relationship between a state variable of the first actuator and the first sensor, a relationship between the second actuator and the second sensor, a relationship between a state variable of the second actuator and the second sensor, a relationship between the first actuator and the second sensor, or a relationship between the first sensor and the second actuator.

12. The computer product of claim 10, wherein the selected environmental maintenance device is the first environmental maintenance device, and the subset of the first set of relationships includes at least an effect of the first environmental maintenance device on itself and an effect of the first environmental maintenance device on the second environmental maintenance device.

13. The computer product of claim 9, wherein the input selecting at least one of the plurality of environmental maintenance devices includes two or more selected environmental maintenance devices, wherein the instructions further cause the computer to:

identify relationships between the selected two or more environmental maintenance devices and remaining ones of the plurality of environmental maintenance devices as the subset of the first set of relationships, wherein the visual representation represents a collective effect of the selected two or more environmental maintenance devices on the remaining ones of the plurality of environmental maintenance devices.

14. The computer product of claim 9, wherein the instructions further cause the computer to:

generate a graphical user interface including a list of the plurality of environmental maintenance devices, wherein the input selecting at least one of the plurality of environmental maintenance devices is received via the graphical user interface.

15. The computer product of claim 9, wherein the instructions further cause the computer to:

determine a numeric value for each of the plurality of environmental maintenance devices representing the subset of the first set of relationships; and display the numeric value with corresponding environmental maintenance device on the visual representation.

16. The computer product of claim 9, wherein the instructions further cause the computer to:

determine one or more additional sets of relationships among the one or more of the plurality of environmental maintenance devices based on at least the historic data associated with the plurality of environmental maintenance devices, wherein the first set of relationships and the one or more additional sets of relationships include a heat transfer rate, an airflow rate and a latent heat transfer rate.

17. The computer product of claim 16, wherein the instructions further cause the computer to:

generate a graphical user interface including a list including all sets of relationships, and receiving an input selecting the first set of relationships via the graphical user interface.

18. An environmental maintenance system comprising:
a plurality of environmental maintenance devices;
a computer that is communicatively linked with the plurality of environmental maintenance devices, and the computer product of claim 10, and that is configured to execute the plurality of instructions of the computer product of claim 10; and
a display device communicatively linked with the computer for displaying the visual representation generated by the computer.

* * * * *